US012759550B2

(12) United States Patent
Matsunaga et al.

(10) Patent No.: US 12,759,550 B2
(45) Date of Patent: Oct. 13, 2026

(54) CONTROL DEVICE FOR MOBILE OBJECT, CONTROL METHOD FOR MOBILE OBJECT, AND STORAGE MEDIUM

(71) Applicant: HONDA MOTOR CO., LTD., Tokyo (JP)

(72) Inventors: Hideki Matsunaga, Wako (JP); Takashi Matsumoto, Wako (JP); Ryoji Wakayama, Wako (JP); Koki Aizawa, Wako (JP); Kento Shirakata, Wako (JP); Yunosuke Kuramitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 18/850,744

(22) PCT Filed: Mar. 29, 2022

(86) PCT No.: PCT/JP2022/015397

§ 371 (c)(1),
(2) Date: Sep. 25, 2024

(87) PCT Pub. No.: WO2023/187972

PCT Pub. Date: Oct. 5, 2023

(65) Prior Publication Data

US 2025/0214581 A1 Jul. 3, 2025

(51) Int. Cl.
*B60W 30/14* (2006.01)
*G05D 1/244* (2024.01)
(Continued)

(52) U.S. Cl.
CPC ........... *B60W 30/146* (2013.01); *G05D 1/244* (2024.01); *G05D 1/65* (2024.01); *G06V 20/588* (2022.01);
(Continued)

(58) Field of Classification Search
CPC .......... B60W 2552/05; B60W 2552/45; G05D 2107/13; G05D 2107/17; G05D 2105/24;
(Continued)

(56) References Cited

U.S. PATENT DOCUMENTS

| | | | |
|---|---|---|---|
| 2014/0136414 | A1 | 5/2014 | Abhyanker |
| 2015/0006005 | A1 | 1/2015 | Yu et al. |

(Continued)

FOREIGN PATENT DOCUMENTS

| | | |
|---|---|---|
| JP | 2006-315482 | 11/2006 |
| JP | 2018-012360 | 1/2018 |

(Continued)

OTHER PUBLICATIONS

Extended European Search Report for European Patent Application No. 22935123.4 dated Apr. 28, 2025.

(Continued)

*Primary Examiner* — Anshul Sood
(74) *Attorney, Agent, or Firm* — Amin, Turocy & Watson, LLP

(57) ABSTRACT

A control device for a mobile object includes: a road type recognition unit configured to recognize whether a region of interest is a roadway or a sidewalk based on a bicycle mark used for guiding a passage of a bicycle and detected by a detection device that detects an external situation of a mobile object that is able to move in both the roadway and the sidewalk; and a control unit configured to control the mobile object based on a result of the recognition of the road type recognition unit.

16 Claims, 10 Drawing Sheets

(51) Int. Cl.

| | |
|---|---|
| ***G05D 1/65*** | (2024.01) |
| ***G05D 105/22*** | (2024.01) |
| ***G05D 105/28*** | (2024.01) |
| ***G05D 107/13*** | (2024.01) |
| ***G05D 107/17*** | (2024.01) |
| ***G06V 20/56*** | (2022.01) |

(52) U.S. Cl.
CPC ..... *B60W 2552/05* (2020.02); *B60W 2552/45* (2020.02); *B60W 2552/50* (2020.02); *B60W 2552/53* (2020.02); *B60W 2554/4041* (2020.02); *G05D 2105/22* (2024.01); *G05D 2105/28* (2024.01); *G05D 2107/13* (2024.01); *G05D 2107/17* (2024.01)

(58) Field of Classification Search
CPC .. G05D 2109/10; G06V 20/58; G06V 20/588; G08G 1/09623
See application file for complete search history.

(56) References Cited

U.S. PATENT DOCUMENTS

| | | | | |
|---|---|---|---|---|
| 2018/0022328 | A1 | 1/2018 | Tochigi et al. | |
| 2018/0232839 | A1 | 8/2018 | Heinla et al. | |
| 2021/0108926 | A1* | 4/2021 | Tran | G06V 20/58 |
| 2023/0245223 | A1* | 8/2023 | Okai | G06Q 30/0261 705/307 |

FOREIGN PATENT DOCUMENTS

| | | |
|---|---|---|
| JP | 2019-197328 | 11/2019 |
| JP | 2021-149951 | 9/2021 |

OTHER PUBLICATIONS

International Search Report and Written Opinion for International Application No. PCT/JP2022/015397 mailed on Jun. 14, 2022, 8 pages.

* cited by examiner

CONTROL DEVICE FOR MOBILE OBJECT, CONTROL METHOD FOR MOBILE OBJECT, AND STORAGE MEDIUM

TECHNICAL FIELD

The present invention relates to a control device for a mobile object, a control method for a mobile object, and a storage medium.

BACKGROUND ART

In the related art, a motor-driven vehicle traveling support device that detects a direction in which a motor-driven vehicle can move from captured image data captured by an imaging unit and controls traveling of the motor-driven vehicle based on the detected direction has been disclosed (for example, see Patent Document 1).

CITATION LIST

Patent Document

Patent Document 1: Japanese Unexamined Patent Application, First Publication No. 2019-197328

SUMMARY OF INVENTION

Technical Problem

However, the foregoing motor-driven vehicle traveling support device cannot recognize a type of road in a region of interest in some cases. In these cases, for example, traveling in accordance with types of roads cannot be achieved.

In view of such circumstances, an object of the present invention is to provide a control device for a mobile object, a control method for a mobile object, and a storage medium capable of recognizing a type of road in a region of interest with high accuracy and realizing control of a mobile object in accordance with the type of road.

Solution to Problem

A control device for a mobile object, a control method for a mobile object, and a storage medium according to aspects of the present invention have the following configurations.

(1) According to an aspect of the present invention, a control device for a mobile object that is able to move in both a roadway and a sidewalk includes: a road type recognition unit configured to recognize whether a region of interest is a roadway or a sidewalk based on a bicycle mark used for guiding a passage of a bicycle and detected by a detection device that detects an external situation of the mobile object; and a control unit configured to control the mobile object based on a result of the recognition of the road type recognition unit.

(2) According to the aspect (1), the road type recognition unit may recognize whether the region of interest is a roadway or a sidewalk based on the bicycle mark and a direction of the bicycle mark.

(3) According to the aspect (1) or (2), the road type recognition unit may recognize whether the region of interest is a roadway or a sidewalk based on the bicycle mark and a sign provided in vicinity of the bicycle mark.

(4) According to any one of the aspect (1) to (3), the road type recognition unit may recognize whether the region of interest is a roadway or a sidewalk based on the bicycle mark and widths of a first road on which the bicycle mark is displayed and a second road adjacent to the first road.

(5) According to any one of the aspect (1) to (4), the road type recognition unit may recognize a road with a narrow width between the first and second road as a sidewalk and recognize a road with a broad width between the first and second roads as a roadway.

(6) According to any one of the aspect (1) to (5), when the bicycle mark is disposed on the first road and a boundary object for distinguishing the first road from the second road adjacent to the first road is adjacent to the bicycle mark, the road type recognition unit may recognize whether a second road is a roadway or a sidewalk based on one or both of presence or absence of a vehicle on the first and second roads and the width of the first road, and the width of the second road.

(7) According to the aspect (6), the boundary object may be a curbstone, a fence, a guardrail, a planting, or a marking line displayed on a road.

(8) According to the aspect (7), the road type recognition unit may recognize a road on which there is no vehicle between the first and second roads as a sidewalk.

(9) According to the aspect (8), the road type recognition unit may recognize a road of which the width is narrow width between the first and second roads as a sidewalk.

(10) According to the aspect (7), the road type recognition unit may identify a road of which the width is narrow between the first and second roads and recognizes the identified road as a sidewalk when there is no vehicle on the identified road.

(11) According to any one of the aspect (1) to (10), the road type recognition unit may recognize whether the region of interest is a roadway or a sidewalk based on the bicycle mark, a direction of the bicycle mark, widths of right and left roads of the bicycle mark, and a sign provided in vicinity of the bicycle mark.

(12) According to any one of the aspect (1) to (11), the road type recognition unit may recognize whether the region of interest is a roadway or a sidewalk based on the bicycle mark and a direction of the bicycle mark when the direction of the bicycle mark is recognizable and may recognize whether the region of the interest is a roadway or a sidewalk based on one or both of the bicycle mark and widths of right and left roads of the bicycle marks and a sign provided in vicinity of the bicycle mark when the direction of the bicycle mark is not recognizable.

(13) According to any one of the aspect (1) to (12), the control unit may control the mobile object in a roadway mode for traveling on a roadway when the mobile object is located on a road recognized as the roadway by the road type recognition unit and may control the mobile object in a sidewalk mode for traveling on a sidewalk when the mobile object is located on a road recognized as the sidewalk by the road type recognition unit.

(14) According to any one of the aspect (1) to (12), the control unit may limit an upper limit speed during traveling of the mobile object to a first speed when the mobile object is located on a road recognized as the roadway by the road type recognition unit and may limit an upper limit speed during traveling of the mobile object to a second speed less than the first speed when the mobile object is located on a road recognized as the sidewalk by the road type recognition unit.

(15) According to another aspect of the present invention, there is provided a control method for a mobile object in a control device for a mobile object that is able to move in both a roadway and a sidewalk. The method includes: recognizing whether a region of interest is a roadway or a sidewalk based on a bicycle mark used for guiding a passage of a bicycle and detected by a detection device that detects an external situation of the mobile object; and controlling the mobile object based on a result of the recognition.

(16) According to still another aspect of the present invention, a storage medium stores a program causing a control device for a mobile object that is able to move in both a roadway and a sidewalk to perform: recognizing whether a region of interest is a roadway or a sidewalk based on a bicycle mark used for guiding a passage of a bicycle and detected by a detection device that detects an external situation of the mobile object; and controlling the mobile object based on a result of the recognition.

Advantageous Effects of Invention

According to the aspects (1) to (16), the control device can realize the recognizing of a type of road in the region of interest with high accuracy and the controlling of the mobile object in accordance with the type of road.

According to the aspect (12), the control device can realize the recognizing of a type of road with high accuracy and the controlling of the mobile object in accordance with the type of road while reducing a processing load by changing a process of recognizing the type of road in accordance with a result of recognition of a direction of the bicycle mark.

DESCRIPTION OF EMBODIMENTS

Hereinafter, embodiments of a control device for a mobile object, a control method for a mobile object, and a storage medium according to the present invention will be described with reference to the drawings.

Hereinafter, the embodiments of the control device for the mobile object, the control method for the mobile object, and the storage medium according to the present invention will be described with reference to the drawings. A mobile object moves on both a roadway and a predetermined region different from the roadway. The mobile object is also referred to as a micro mobility. An electric kick scooter is a type of micromobility. The predetermined region is, for example, a sidewalk. The mobile object may be a vehicle which a passenger can board or an autonomous mobile object that can perform unmanned autonomous traveling. The latter autonomous mobile object is used for convey luggage or the like. The mobile object may include a small mobility that carries luggage or leads people while walking alongside a user as well as other autonomous mobile objects (such as walking robots). The predetermined region may include some or all of roadside strips, bicycle lanes, and open spaces or may include some or all of sidewalks, roadside strips, bicycle lanes, and open spaces. In the following description, the predetermined region is assumed to be a sidewalk. In the following description, a portion described as "sidewalk" can be read as a "predetermined region" as appropriate.

Figure 1:
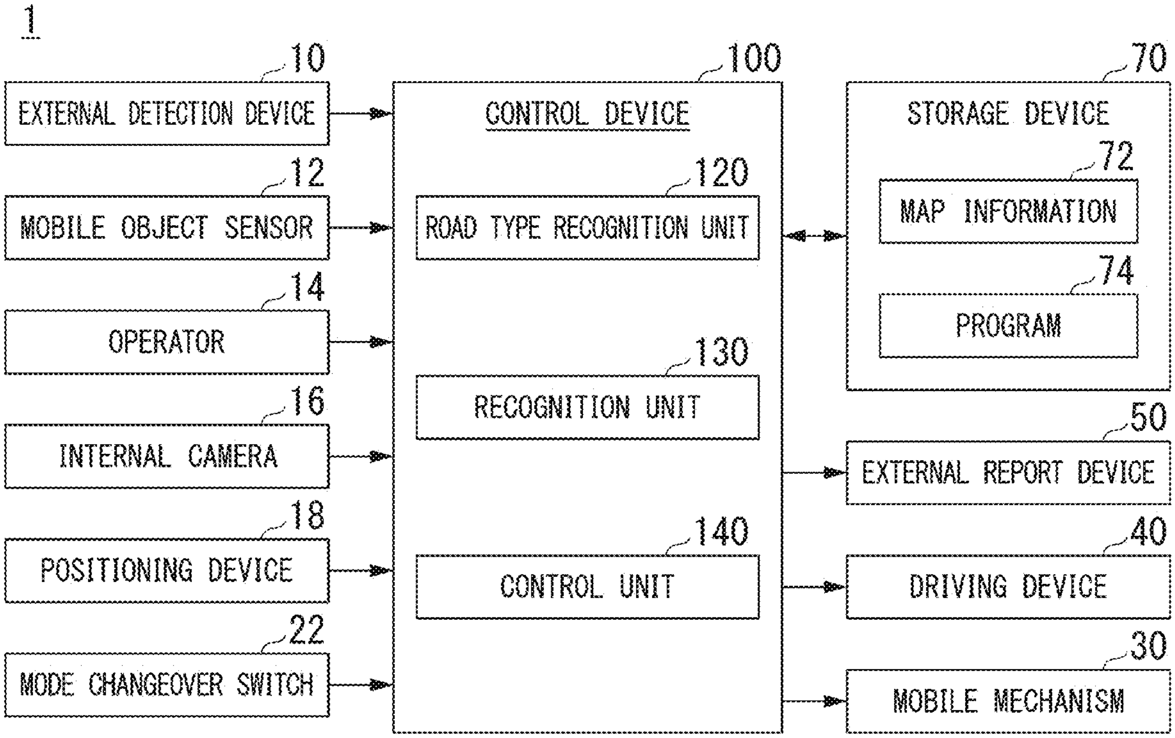
FIG. 1 A diagram illustrating examples of a mobile object 1 and a control device 100 according to an embodiment.

FIG. 1 is a diagram illustrating examples of a mobile object 1 and a control device 100 according to an embodiment. On the mobile object 1, for example, an external detection device 10, a mobile object sensor 12, an operator 14, an internal camera 16, a positioning device 18, a mode changeover switch 22, a mobile mechanism 30, a driving device 40, an external report device 50, a storage device 70, and a control device 100 are mounted. Of the configurations, some configurations that are not essential for realizing functions of the present invention may be omitted.

The external detection device 10 is any of various devices in which a traveling direction of the mobile object 1 is a detection range. The external detection device 10 includes an external camera, a radar device, a light detection and ranging (LIDAR), and sensor fusion device. The external detection device 10 outputs information (an image, a position of an object, or the like) indicating a detection result to the control device 100.

The mobile object sensor 12 includes, for example, a speed sensor, an accelerations sensor, a yaw rate (angular velocity) sensor, an azimuth sensor, and an operation amount detection sensor mounted on the operator 14. The operator 14 includes, for example, an operator (for example, an acceleration pedal or a brake pedal) that gives an instruction for acceleration or deceleration and an operator (for example, a steering wheel) that instructs steering. In this case, the mobile object sensor 12 may include an accelerator opening sensor, a brake depression amount sensor, and a steering torque sensor. The mobile object 1 may include another type of operator (for example, a rotational operator (that is not annular), a joystick, a button, or the like) as the operator 14.

The internal camera 16 images at least a head of a passenger of the mobile object 1 from the front. The internal camera 16 is a digital camera in which an image sensor such as a charge coupled device (CCD) or a complementary metal oxide semiconductor (CMOS) is used. The internal camera 16 outputs a captured image to the control device 100.

The positioning device 18 is a device that positions the mobile object 1. The positioning device 18 is, for example, a global navigation satellite system (GNSS) receiver, and identifies a position of the mobile object 1 based on a signal received from a GNSS satellite and outputs the position as positional information. The positional information of the mobile object 1 may be estimated from a position of a Wi-Fi base station to which a communication device to be described below is connected.

The mode changeover switch 22 is a switch that is operated by a passenger. The mode changeover switch 22 may be a mechanical switch or a graphical user interface (GUI) switch set on a touch panel. The mode changeover switch 22 receives an operation of switching a driving mode to one of mode A that is an assist mode in which one of a steering operation and an acceleration or deceleration control is performed by a passenger and the other thereof is automatically performed, and may be mode A-1 in which a steering operation is performed by a passenger and acceleration or deceleration speed control is automatically performed or may be a mode A-2 in which an acceleration or deceleration speed operation is performed by a passenger and steering control is automatically performed; mode B that is a manual driving mode in which a steering operation and an acceleration or deceleration speed operation are performed by a passenger; and mode C that is an automated driving mode in which steering control and acceleration or deceleration speed control are automatically performed.

The mobile mechanism 30 is a mechanism that moves the mobile object 1 on a road. The mobile mechanism 30 is, for example, a wheel group including a steering wheel and a driving wheel. The mobile mechanism 30 may also be legs for multi-legged walking.

The driving device 40 outputs a force to the mobile mechanism 30 to move the mobile object 1. For example, the driving device 40 includes a motor that drives a driving wheel, a battery that stores power to be supplied to the motor, and a steering device that adjusts a steering angle of a steering wheel. The driving device 40 may include an internal combustion engine or a fuel cell as driving force output means or power generation means. The driving device 40 may further include a brake device using a frictional force or air resistance.

The external report device 50 is provided, for example, on an outer plate of the mobile object 1 and is a lamp, a display device, a speaker, or the like that reports information to the outside of the mobile object 1. The external report device 50 performs different operations according to whether the mobile object 1 is moving on a sidewalk or the mobile object 1 is moving on a roadway. For example, the external report device 50 is controlled such that a lamp is caused to emit light when the mobile object 1 is moving on a sidewalk and the lamp is caused not to emit light when the mobile object 1 is moving on a roadway. A light color of the lamp is preferably a color defined by law. The external report device 50 may be controlled such that the lamp is caused to emit green light when the mobile object 1 is moving on a sidewalk and the lamp is caused to emit blue light when the mobile object 1 is moving on a roadway. When the external report device 50 is a display device, the external report device 50 displays text or graphics indicating "moving on a sidewalk" when the mobile object 1 is traveling on the sidewalk.

Figure 2:
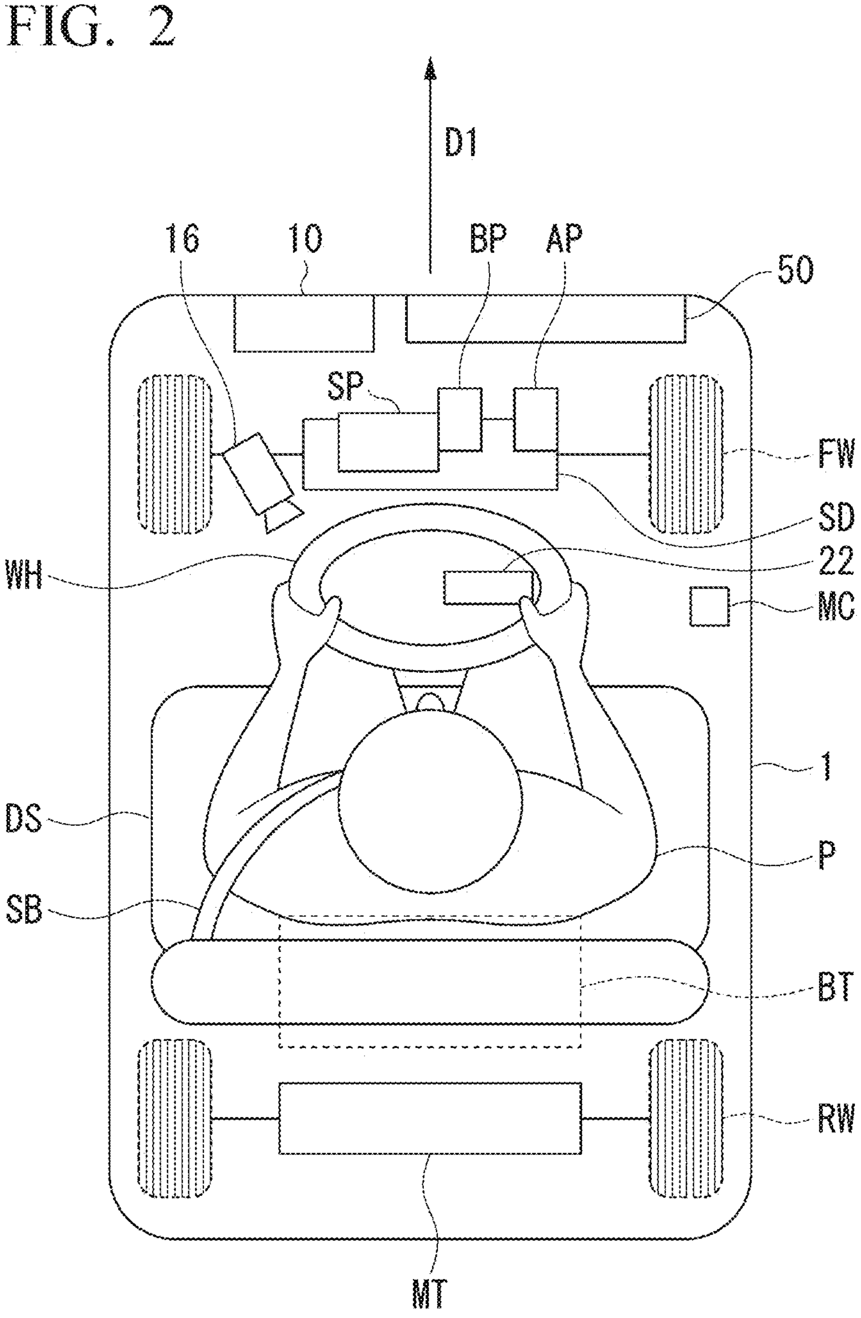
FIG. 2 A perspective view illustrating the mobile object 1 when viewed from above.

FIG. 2 is a perspective view illustrating the mobile object 1 when viewed from above. In the drawing, FW denotes a steering wheel, RW denotes a driving wheel, SD denotes a steering device, MT denotes a motor, and BT denotes a battery. The steering device SD, the motor MT, and the battery BT are included in the driving device 40. AP denotes an acceleration pedal, BP denotes a brake pedal, WH denotes a steering wheel, SP denotes a speaker, and MC denotes a microphone. The illustrated mobile object 1 is a single-passenger vehicle and a passenger P seated in a driver seat DS and wears a seatbelt SB. An arrow D1 is a traveling direction (velocity vector) of the mobile object 1. The external detection device 10 is located in the vicinity of a front end of the mobile object 1, the internal camera 16 is located at a position at which the head of the passenger P can be imaged from the front of the passenger P, and the mode changeover switch 22 is located on a boss of the steering wheel WH. The external report device 50 serving as a display device is provided in the vicinity of the front end of the mobile object 1.

Referring back to FIG. 1, the storage device 70 is, for example, a non-transitory storage device such as a hard disk drive (HDD), a flash memory, or a random access memory (RAM). The storage device 70 stores map information 72, a program 74 that is executed by the control device 100, and the like. In the drawing, the storage device 70 is illustrated outside of a range of the control device 100, but the storage device 70 may be included in the control device 100. The storage device 70 may be provided on a server (not illustrated).

[Control Device]

The control device 100 includes, for example, a road type recognition unit 120, a recognition unit 130, and a control unit 140. These constituent elements are realized, for example, by causing a hardware processor such as a central processing unit (CPU) to execute a program (software) 74. Some or all of the constituent elements may be realized by hardware (including a circuitry) such as a large scale integration (LSI), an application specific integrated circuit (ASIC), a field-programmable gate array (FPGA), or a graphics processing unit (GPU) or may be realized in cooperation between software and hardware. The program may be stored in advance in the storage device 70, or may be stored in a detachable storage medium (non-transitory storage medium) such as a DVD or a CD-ROM and the storage medium may be mounted on a drive device to be installed in the storage device 70.

The road type recognition unit 120 recognizes whether the mobile object 1 is moving on a roadway or a sidewalk. The road type recognition unit 120 recognizes whether the mobile object 1 is moving on a roadway or a sidewalk, for example, by analyzing an image captured by an external camera of the external detection device 10. The external camera may be a plurality of cameras (for example, stereo cameras). An output of a radar device, an LIDAR, a sensor fusion device, or the like may be used supplementarily.

Based on an image captured by the external camera, the road type recognition unit 120 recognizes whether the mobile object 1 is moving on a roadway or a sidewalk. For example, the road type recognition unit 120 classifies pixels in a frame of an image by semantic segmentation into classes, assigns labels, and assumes a plurality of virtually divided regions and boundary lines therebetween. The road type recognition unit 120 classifies at least regions of an image captured by the external camera into a region where there is the mobile object 1 (hereinafter referred to as a self-region) and a region which is adjacent to the self-region and where there is no mobile object 1 (hereinafter referred to as an adjacent region) to perform a process. For example, the road type recognition unit 120 recognizes whether a region of interest (for example, a self-region) is a sidewalk or a roadway by using a bicycle mark displayed on a road. The details of the process will be described below.

The recognition unit 130 recognizes objects that are around the mobile object 1 based on an output of the external detection device 10. The objects include some or all of mobile objects such as pedestrians, vehicles and bicycles, runway boundaries such as lane marking lines, steps, guardrails, road shoulders and median strips, structures provided on roads, such as road marks (signs) or signboards, and obstacles such as debris located (fallen) on runways. For example, the recognition unit 130 acquires information such as presence, positions, types, and the like of other mobile objects by inputting the images captured by the external camera to a trained model that is trained to output information such as presence, positions, types, and the like of objects when images captured by the external camera of the external detection device 10 are input. The types of other mobile objects can also be estimated based on sizes of the objects in the images, intensity of reflected waves received by a radar device of the external detection device 10, and the like. For example, the recognition unit 130 acquires speeds of other mobile objects detected by the radar device using Doppler shift or the like.

For example, the control unit 140 controls the driving device 40 in accordance with a set driving mode. The mobile object 1 may perform only some of the following driving modes and the control unit 140 causes speed limit values to be different between cases in which the mobile object 1 is moving on a roadway and is moving on a sidewalk in any case. In this case, the mode changeover switch 22 may be omitted.

In mode A-1, the control unit 140 controls the motor MT of the driving device 40 such that a distance to an object located in front of the mobile object 1 is kept at a given distance or more when the mobile object 1 is moving on a roadway with reference to information regarding a runway and the object based on an output of the recognition unit 130, and the mobile object 1 is moving at a first speed V1 (for example, a speed equal to or greater than 10 [km/h] and less than tens of [km/h]) when the distance to the object located in front of the mobile object 1 is sufficiently long.

The control unit 140 controls the motor MT of the driving device 40 such that the distance to the object located in front of the mobile object 1 is kept at the given distance or more when the mobile object 1 is moving on a roadway and the mobile object 1 is moving at a second speed V2 (for example, a speed less than 10 [km/h]) when the distance to the object located in front of the mobile object 1 is sufficiently long. This function is similar to an adaptive cruise control (ACC) function of a vehicle that has the first speed V1 or the second speed V2 as a set speed, and a technology used in ACC can be used. In mode A-1, the control unit 140 controls the steering device SD such that a steering angle of the steering wheel is changed based on an operation amount of the operator 14 such as a steering wheel. This function is similar to a function of a power steering device and a technology used in a power steering device can be used. For steering, the mobile object 1 may include a steering device to which the operator 14 and the steering mechanism are mechanically connected without performing electronic control.

In mode A-2, the control unit 140 generates a movable target trajectory in which movement is possible while avoiding an object in a runway with reference to information regarding the runway and the object based on an output of the recognition unit 130 and controls the steering device SD of the driving device 40 such that the mobile object 1 moves along the target trajectory. For an acceleration or deceleration speed, the control unit 140 controls the motor MT of the driving device 40 based on a speed of the mobile object 1 and an operation amount of the acceleration pedal or the brake pedal. The control unit 140 controls the motor MT of the driving device 40 using the first speed V1 as an upper limit speed when the mobile object 1 is moving on a roadway (which, in the case of mode A-2, means that the mobile object 1 is not accelerated even when an additional acceleration instruction is given when a speed reaches the upper limit speed) and controls the driving device 40 using the second speed V2 as an upper limit speed when the mobile object 1 is moving on a sidewalk.

In mode B, the control unit 140 controls the motor MT of the driving device 40 based on a speed of the mobile object 1 and an operation amount of the acceleration pedal or the brake pedal. The control unit 140 controls the motor MT of the driving device 40 using the first speed V1 as the upper limit speed when the mobile object 1 is moving on a roadway (which, in the case of mode B, means that the mobile object 1 is not accelerated even when an additional acceleration instruction is given when a speed reaches the upper limit speed) and controls the driving device 40 using the second speed V2 as an upper limit speed when the mobile object 1 is moving on a sidewalk. The steering is similar to that of mode A-1. Hereinafter, a mode in the case of traveling on a roadway is referred to as mode B1 (second movement mode) and a mode in the case of traveling on a sidewalk is referred to as a mode B2 (first movement mode).

In mode C, the control unit 140 generates a movable target trajectory in which movement is possible while avoiding an object in a runway with reference to information regarding the runway and the object based on an output of the recognition unit 130 and controls the driving device 40 such that the mobile object 1 moves along the target trajectory. In mode C, the control unit 140 controls the driving device 40 using the first speed V1 as the upper limit speed when the mobile object 1 is moving on a roadside, and controls the driving device 40 using the second speed V2 as the upper limit speed when the mobile object 1 is moving on a sidewalk

[Process Using Bicycle Mark]

The road type recognition unit 120 recognizes whether a region of interest is a roadway or a sidewalk based on a bicycle mark for guiding passage of a bicycle detected by the external detection device 10. The control unit 140 controls the mobile object 1 based on a recognition result recognized by the road type recognition unit 120. For example, the control unit 140 controls the mobile object 1 in a roadway mode for traveling on a roadway when the mobile object 1 is located on a road recognized as a roadway by the road type recognition unit 120. The roadway mode is a mode in which the upper limit speed during traveling is limited to the first speed. The control unit 140 controls the mobile object 1 in a sidewalk for traveling on a sidewalk when the mobile object 1 is located on a road recognized as a sidewalk by the road type recognition unit 120. The sidewalk mode is a mode in which the upper limit speed during traveling is limited to the second speed.

Figure 3:
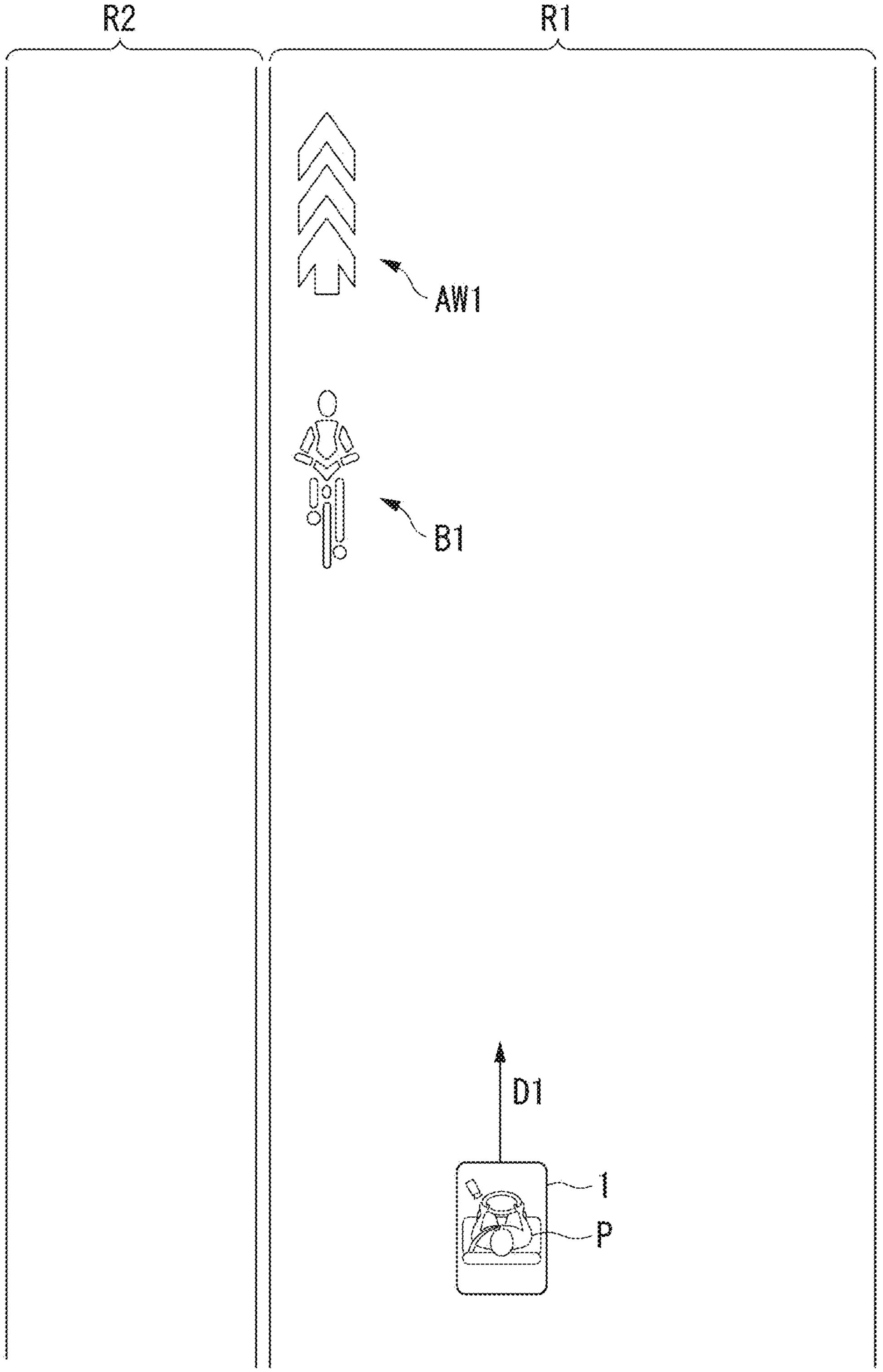
FIG. 3 A diagram illustrating an example of a road including a bicycle mark.

The road type recognition unit 120 recognizes whether the region of interest is a roadway or a sidewalk based on a bicycle mark and a direction of the bicycle mark. FIG. 3 is a diagram illustrating an example of a road including a bicycle mark. In FIG. 3 (and subsequent drawings), a bird's eye view from above is illustrated for description, but each process may be performed on an image plane. As illustrated in FIG. 3, it is assumed that there are roads R1 and R2 and the road R1 is a roadway and the road R2 is a sidewalk. A bicycle mark B1 is displayed on the road R1. The mobile object 1 is moving in a direction D1. The road type recognition unit 120 recognizes the bicycle mark and a direction indicated by an arrow AW1 of the bicycle mark. A guide direction indicated by the arrow AW1 is a direction that is the same as the direction D1. The guide direction is a direction in which a bicycle is designed to travel. For example, a bicycle is recommended to travel in the guide direction along the bicycle mark on a road. The road type recognition unit 120 recognizes that a road on the left side of the guide direction (or the right side if regulations require driving on the right) is a sidewalk and a road on the right side is a roadway.

Figure 4:
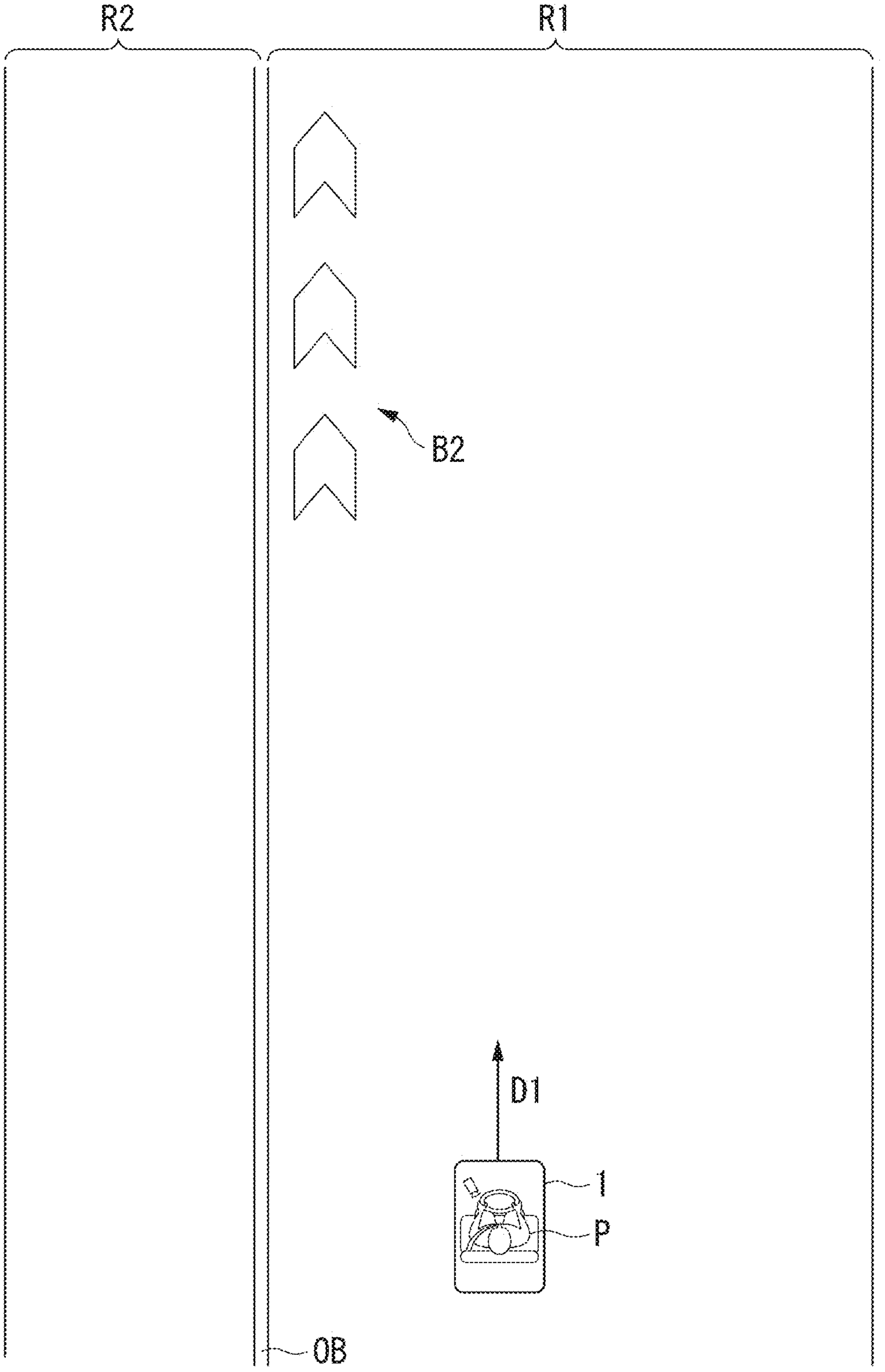
FIG. 4 A diagram illustrating another example of a road including a bicycle mark.

FIG. 4 is a diagram illustrating another example of a road including a bicycle mark. The road type recognition unit 120 recognizes a direction indicated by a bicycle mark B2. A guide direction indicated by the bicycle mark B2 is a direction that is the same as the direction D1. The road type recognition unit 120 recognizes that a road on the left side of the guide direction is a sidewalk and a road on the right side is a roadway.

The storage device 70 stores feature information of various bicycle marks such as the bicycle marks B1 and B2. The feature information is information (information indicating a distribution of edges, a distribution of luminance values, or the like) indicating features obtained by performing an image recognition process on captured images of the bicycle marks B1 and B2. The road type recognition unit 120 recognizes a bicycle mark or a direction indicated by the bicycle mark based on the feature information obtained from the captured image of the bicycle mark B1 or B2 and the feature information stored in the storage device 70.

(Process in Consideration of Width of Road)

In the foregoing process, widths of roads may be added. The road type recognition unit 120 may recognize whether a region of interest may be a roadway or a sidewalk based on a bicycle mark and widths of roads on the right and left sides of the bicycle mark. The road type recognition unit 120 recognizes a road with a narrow width between a first road including a bicycle mark and a second road adjacent to the first road as a sidewalk and recognizes a road with a broad width as a roadway.

The second road adjacent to the first road includes, for example, the second road adjacent to the first road via a boundary object for distinguishing the first road from the second road. The boundary object is, for example, an object with a narrow width provided at a boundary between a sidewalk and a roadway, such as a curbstone, a fence, a guardrail, a planting, or a marking line displayed on a road.

For example, as in FIG. 4, a boundary object OB is provided on the left side of the bicycle mark B2 and between the road R1 and the road R2. The road type recognition unit 120 may recognize the width of the road R1 and the width of the road R2 and may recognize the road R2 with a short width as a sidewalk. The width is a length in a width direction of the road. The width of the road R1 may be, for example, a width excluding the bicycle mark B2.

When a bicycle mark is provided on the first road 1 (the road R1 or R2) and a boundary object for distinguishing the first road from the second road adjacent to the first road is adjacent to the bicycle mark, the road type recognition unit 120 may recognize whether the second road is a roadway or a sidewalk based on one or both of presence or absence of vehicles on the first and second roads and the width of the first road and the width of the second road. This is because the widths are required with higher accuracy when there is the boundary object. As will be described below, a road on which there is a vehicle is determined to be a roadway and a road on which there is no vehicle is determined to be a sidewalk.

Figure 5:
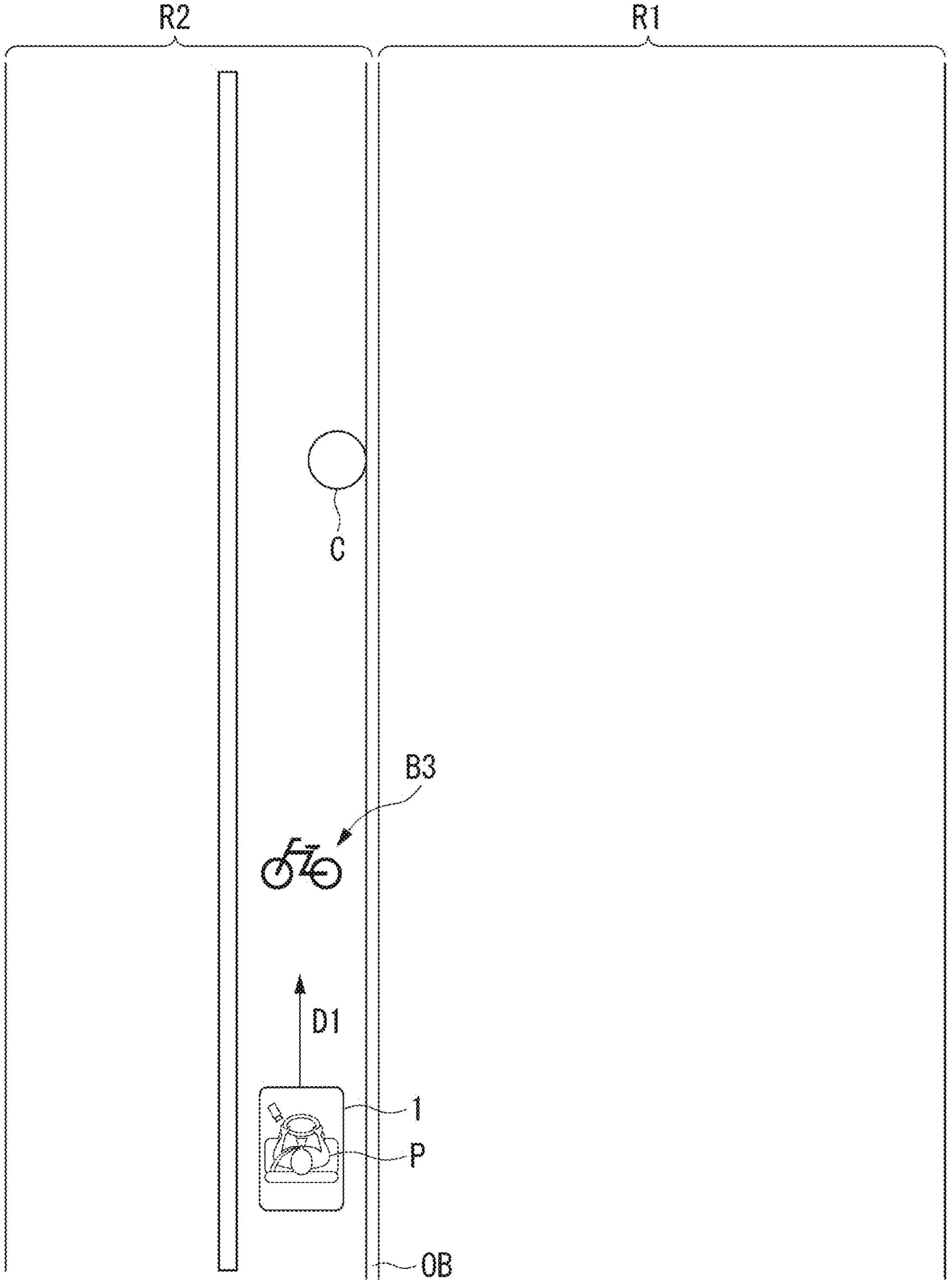
FIG. 5 A diagram illustrating still another example of a road including a bicycle mark.

As illustrated in FIG. 5 to be described below, even when the bicycle mark is displayed on the sidewalk, a road with a short width between the first and second roads may be recognized as a roadway.

(Process in Consideration of Sign)

The road type recognition unit 120 may recognize whether a region of interest is a roadway or a sidewalk based on a sign provided in the vicinity of a bicycle mark. FIG. 5 is a diagram illustrating still another example of a road including a bicycle mark. In the example of FIG. 5, a bicycle mark B3 is displayed on the road R2 and a marking line is marked on the breadth (opposite direction to the boundary object) of the bicycle mark B3. It is recommended that a bicycle travels between the marking line and the boundary object (guard lane).

The bicycle mark B3 does not have a mark indicating a traveling direction. For example, when the bicycle mark B3 is displayed on a sidewalk, a bicycle can travel in either direction. For example, a bicycle can travel in the direction D1 and can also travel in an opposite direction to the direction D1. Therefore, even when the road type recognition unit 120 recognizes the bicycle mark B3, it may be difficult to recognize the region of interest is a roadway or a sidewalk since there is no direction of the bicycle mark, as described above.

Thus, based on a sign C provided in the vicinity of the bicycle mark, the road type recognition unit 120 recognizes whether the region of interest is a roadway or a sidewalk. The vicinity of the bicycle mark is a sign provided in a guide lane or in the vicinity of the guide lane.

Figure 6:
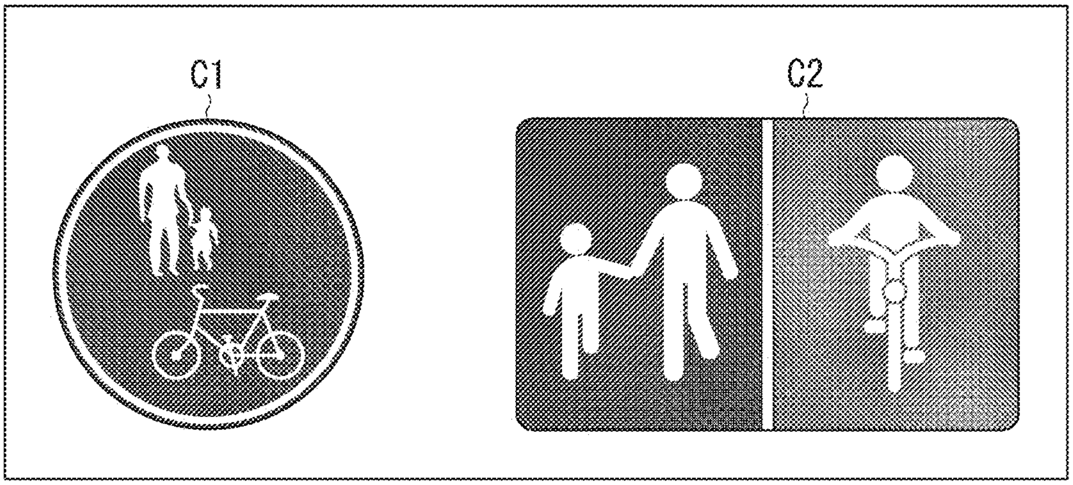
FIG. 6 A diagram illustrating examples of signs.

FIG. 6 is a diagram illustrating examples of signs. A sign C1 indicates that the road R2 is a road on which a pedestrian and a bicycle can travel. A sign C2 is a sign indicating that a passage lane for pedestrians and a passage lane for bicycles are separated. The passage lane for pedestrians is a passage lane in which passage of pedestrians is preferred or passage of pedestrians is recommended (or permitted). The passage lane for bicycles is a passage lane in which passage of bicycles is preferred or passage of bicycles is recommended (or permitted). For any of the signs C1 and C2, when the sign C is provided in the vicinity of the bicycle mark, it can be understood that the road R2 is not a roadway and is a predetermined region different form the roadway.

The road type recognition unit 120 recognizes whether a region of interest is a roadway or a sidewalk based on the bicycle mark B3 and the sign described above. In the foregoing example, when the bicycle mark does not include information indicating a guide direction, the road type recognition unit 120 refers to the sign, as described above. Instead of this, even when the bicycle mark includes information indicating the guide direction, a type of road in the region of interest may be recognized with reference to the sign.

The road type recognition unit 120 can recognize a type of road with higher accuracy by using the bicycle mark and the sign described above.

(Process Using Element Include in Road)

The road type recognition unit 120 may recognize whether a region of interest is a roadway or a sidewalk by using a bicycle mark and various elements included in a road.

Figure 7:
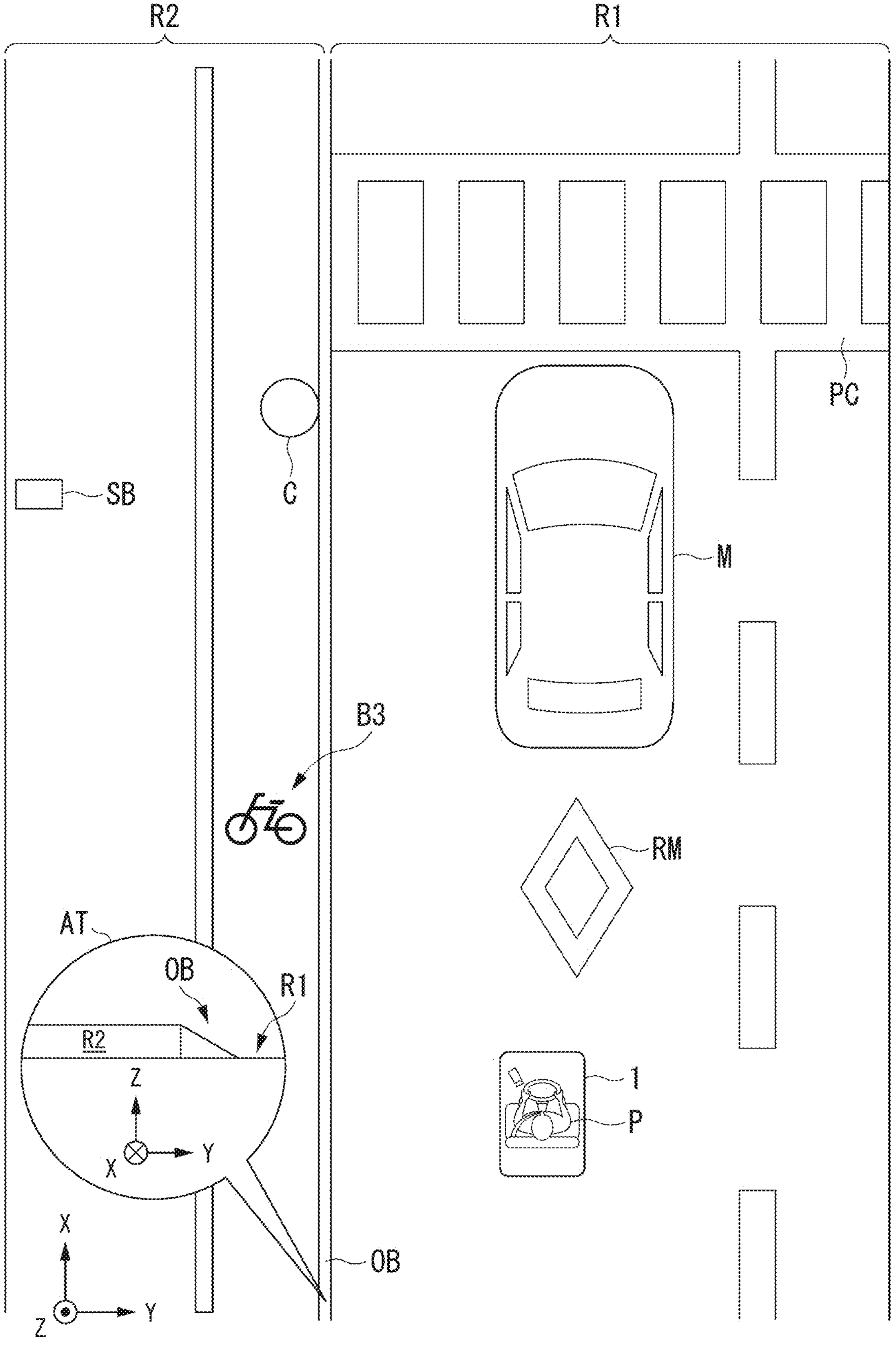
FIG. 7 A diagram illustrating a process in which various elements are used.

FIG. 7 is a diagram illustrating a process in which various elements are used. Differences from FIG. 5 will be described mainly. The various elements are, for example, static obstacles (a standing board SB, a mail box, a utility pole, a waste basket, and the like), a vehicle M, a road surface mark RM, a pedestrian crossing PC, and a shape of boundary object.

For example, the road type recognition unit 120 determines that a region satisfying many of the following conditions is a roadway and a region not satisfying many of the following conditions is a sidewalk. The conditions are, for example, conditions that there is no static obstacle, the vehicle M stops or is moving, there is no pedestrian, there is the road surface mark RM on a road surface, and there is a pedestrian crossing PC. It may be determined that the boundary object OB is a curbstone and a region in a direction in which a step difference of the curbstone descends is a roadway.

For example, when the boundary object OB descends from the road R2 to the road R1 as in AT indicating a cross-sectional view of a curbstone seen in an X direction of FIG. 7, it may be determined that the road R1 is a roadway.

The road type recognition unit 120 may recognize that the region of interest is a roadway when there is the bicycle mark and a predetermined number of conditions (one or more conditions) is satisfied among the foregoing conditions (see FIGS. 3 and 4). The road type recognition unit 120 may recognize that the region of interest is a sidewalk when there is the bicycle mark and a predetermined number of conditions (one or more conditions) is not satisfied among the foregoing conditions (see FIGS. 5 and 7).

Figure 8:
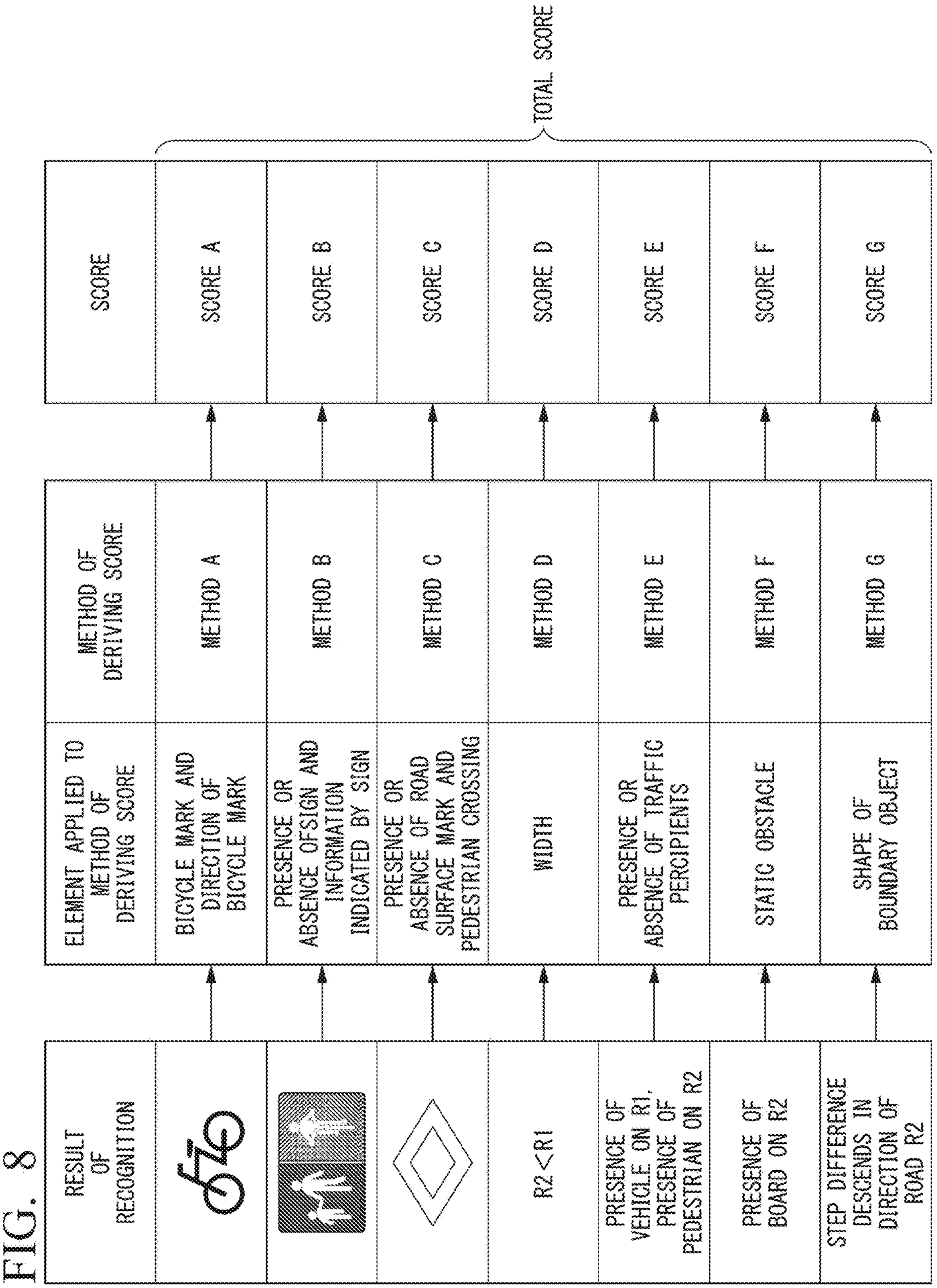
FIG. 8 A diagram illustrating an example of a scheme of deriving a score.

The road type recognition unit 120 may derive a score using information (the bicycle mark and various elements) obtained from a result of the recognition of the recognition unit 130 and may recognize whether the region of interest is a roadway or a sidewalk based on the derived score, as illustrated in FIG. 8.

FIG. 8 is a diagram illustrating an example of a scheme of deriving a score. For example, a result of the recognition of the recognition unit 130 is applied by a method of deriving a score in accordance with the result of the recognition and the score is derived in accordance with the result of the recognition. For example, a score in accordance with the bicycle mark and the direction of the bicycle mark, a score in accordance with presence or absence of a sign and information indicated by the sign, a score in accordance with a road surface display (presence or absence of a road surface display and information indicated by the road surface display) or a score in accordance with presence or absence of a pedestrian crossing, a score in accordance with a width, a score in accordance with presence or absence (or a distribution) of traffic participants, a score in accordance with presence or absence of a static obstacle, a score in accordance with the shape of a boundary object, and the like are derived. The scores are given in accordance with, for example, presence or absence, types, sizes, widths, and the like of elements.

The road type recognition unit 120 compares a total score obtained by totalizing the scores derived in this way with thresholds of the scores and recognizes whether a region of interest is a roadway or a sidewalk. For example, when the total score is a score indicating that the region of interest is similar to a roadway and the total score is equal to or greater than a threshold, the road type recognition unit 120 recognizes that the region of interest is the roadway. For example, when many above-described conditions are satisfied, a higher total score tends to be derived than when many above-described conditions are not satisfied.

For example, when the total score is a score indicating that the region of interest is similar to a sidewalk and the total score is equal to or greater than a threshold, the road type recognition unit 120 recognizes that the region of interest is the sidewalk. For example, when many above-described conditions are not satisfied, a higher total score tends to be derived than when many above-described conditions are satisfied.

[Flowchart]

Figure 9:
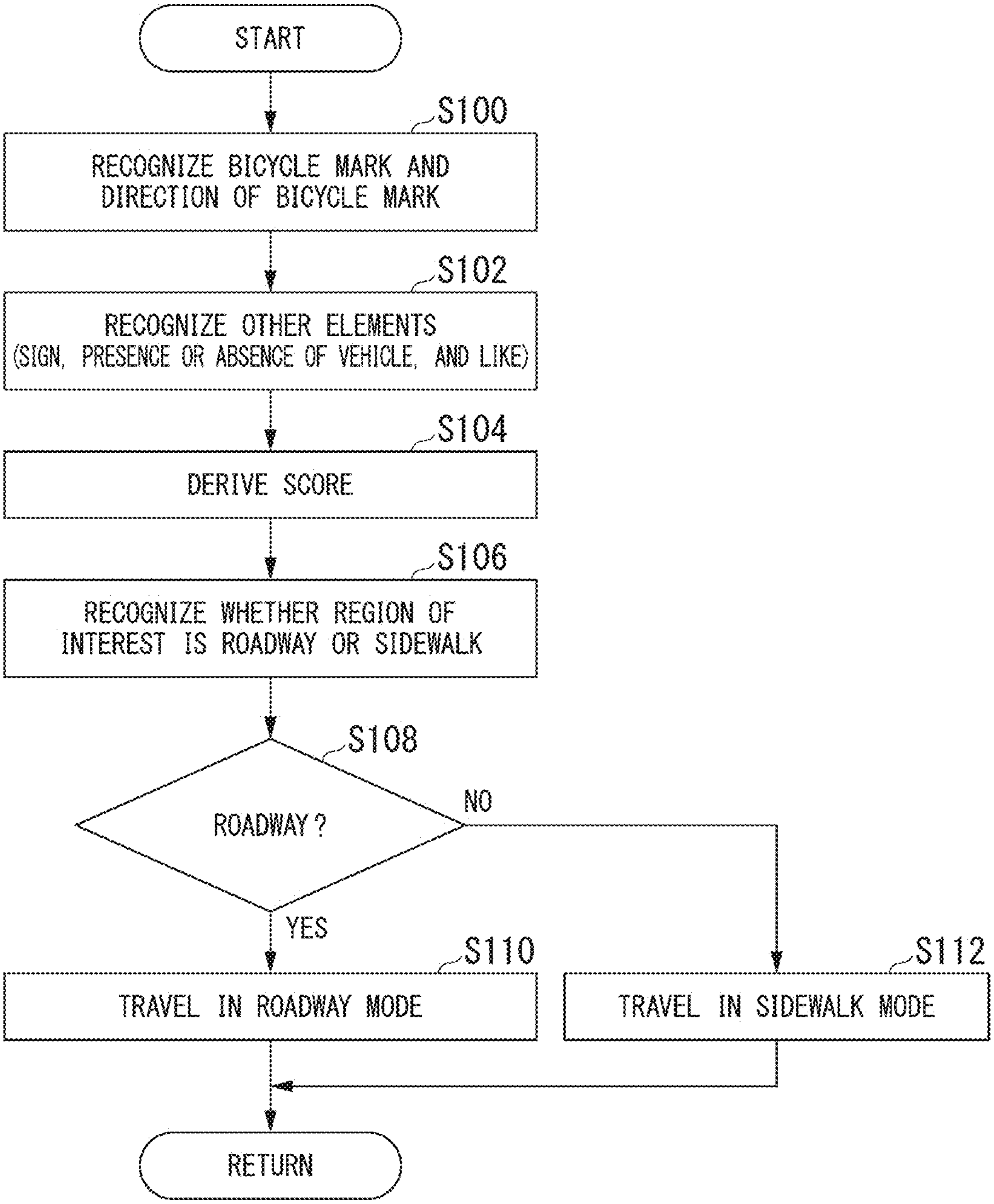
FIG. 9 A flowchart illustrating an example of a flow of a process performed by a control device 100.

FIG. 9 is a flowchart illustrating an example of a flow of a process performed by a control device 100. First, the recognition unit 130 recognizes the bicycle mark and the direction of the bicycle mark (or that there is no direction) (step S100). Subsequently, the recognition unit 130 recognizes elements included in a road different from the bicycle mark (the above-described sign, presence or absence of a vehicle, and the like) (step S102). Subsequently, the road type recognition unit 120 derives the score based on results of the recognition of steps S100 and S102 (step S104) and recognizes whether the region of interest is a roadway or a sidewalk based on the derived score (step S106).

Subsequently, if the road type recognition unit 120 recognizes that the region of interest is the roadway, the control unit 140 causes the mobile object 1 to move in the roadway mode when the mobile object 1 moves in the region of interest (steps S108 and S110). If the road type recognition unit 120 recognizes that the region of interest is the sidewalk, the control unit 140 causes the mobile object 1 to move in the sidewalk mode when the mobile object 1 moves in the region of interest (steps S108 and S112). In this way, the process of one routine of the flowchart ends.

As described above, the control device 100 can recognize a type of road in the region of interest with high accuracy. Accordingly, the control device 100 can control the mobile object 1 according to an aspect appropriate for a surrounding situation.

Modified Examples

If the direction of the bicycle mark can be recognized, the road type recognition unit may recognize whether the region of interest is a roadway or a sidewalk based on the bicycle mark and the direction of the bicycle mode. If the direction of the bicycle mark cannot be recognized, the road type recognition unit may recognize whether the region of interest is a roadway or a sidewalk based on one or both of the bicycle mark and the widths of the right and left roads of the bicycle mark and the sign provided in the vicinity of the bicycle mark.

Figure 10:
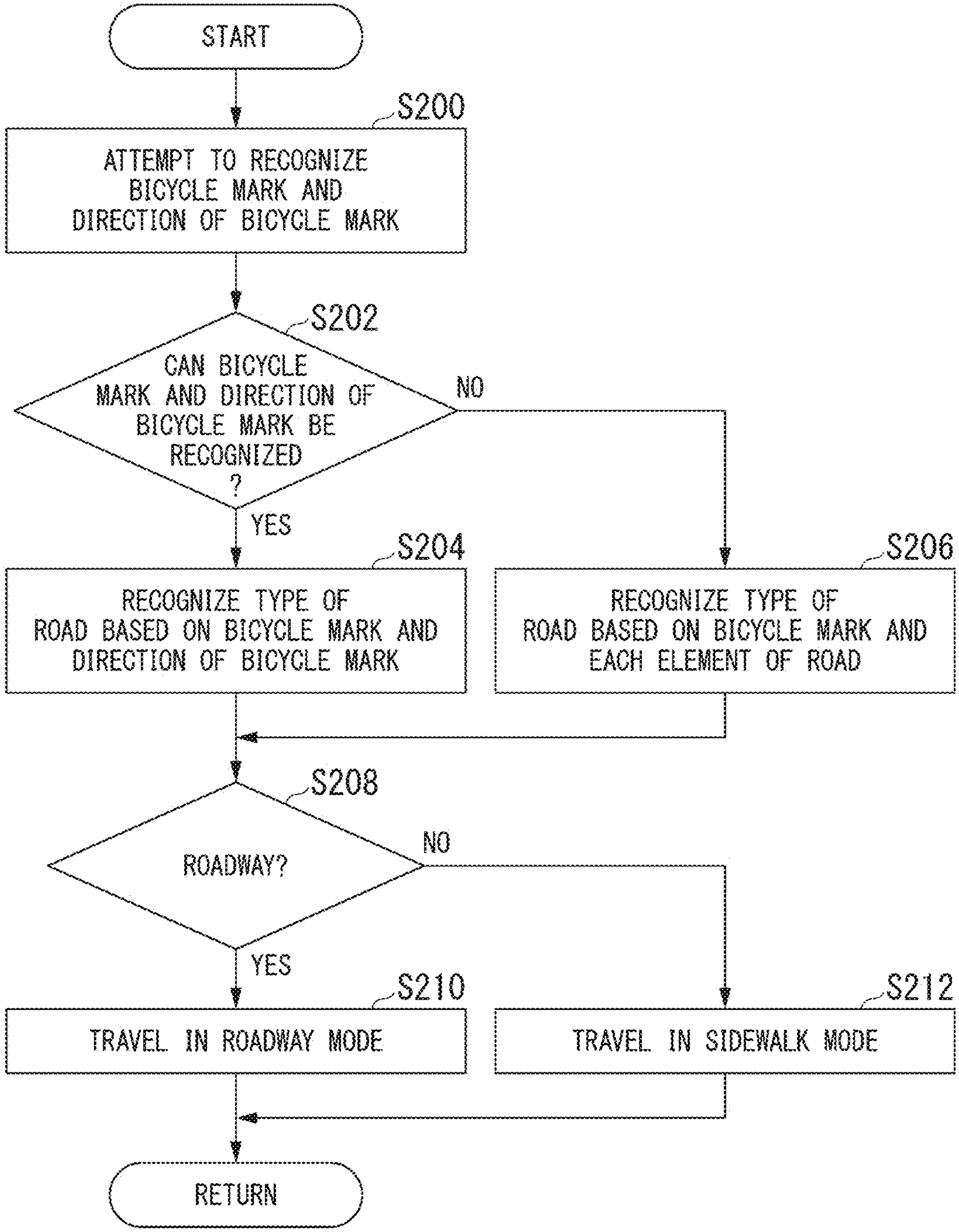
FIG. 10 A flowchart illustrating an example of a flow of a process performed by the control device 100 according to a modified example.

FIG. 10 is a flowchart illustrating an example of a flow of a process performed by the control device 100 according to a modified example. First, the recognition unit 130 attempts to recognize the bicycle mark and the direction of the bicycle mark (step S200). If the bicycle mark and the direction of the bicycle mark can be recognized, the road type recognition unit 120 recognizes a type of road based on the bicycle mark and the direction of the bicycle mark (step S204). For example, if the bicycle mark and the direction of the bicycle mark can be recognized, the road type recognition unit 120 recognizes that the region where the bicycle mark is displayed is a roadway.

If the bicycle mark and the direction of the bicycle mark cannot be recognized, the road type recognition unit 120 recognizes a type of road based on the bicycle mark and various elements of the road (step S206).

Subsequently, if the road type recognition unit 120 recognizes that the region of interest is the roadway, the control unit 140 causes the mobile object 1 to move in the roadway mode when the mobile object 1 moves in the region of interest (steps S208 and S210). If the road type recognition unit 120 recognizes that the region of interest is the sidewalk, the control unit 140 causes the mobile object 1 to move in the sidewalk mode when the mobile object 1 moves in the region of interest (steps S208 and S212). Accordingly, the process of one routine of the flowchart ends.

According to the foregoing modified example, the control device 100 can recognize the type of road with high accuracy and can realize control of the mobile object in accordance with the type of road while reducing a processing load by changing the process of recognizing the type of road in accordance with the result of the recognition of the direction of the bicycle mark.

In the foregoing example, the road type recognition unit 120 derives the score in accordance with the result of the recognition by applying the method of deriving the score in accordance with the result of the recognition, as described above. However, instead of this, the total score may be derived using a trained model. The trained model is a model that outputs a score in accordance with input information when the bicycle mark, the direction of the bicycle mark, and information regarding various elements are input. The trained model is a model in which learning data is learned. The learning data is information in which information such as the bicycle mark, the direction of the bicycle mark, information regarding various elements is associated with a type of road corresponding to information (answer data indicating a roadway or a sidewalk). The trained model outputs a high score, for example, when a score for estimating that the region of interest is a roadway is output and the information such as the bicycle mark corresponding to the roadway, the direction of the bicycle mark, and the information regarding various elements is input.

The trained model may be a model that outputs a score indicating whether a region indicated by an image is a roadway or a sidewalk when the image is input. The trained model outputs a score indicating that a region of interest is a roadway, for example, when an image of the roadway is input, and outputs a score indicating that the region of interest is a sidewalk, for example, when an image of the sidewalk is input. Learning data used to train the trained model is, for example, information in which an image of a roadway including information indicating the bicycle mark and information indicating the direction of the bicycle mark (an image of a roadway) and a type of road corresponding to the information (for example, answer data indicating the roadway) are associated. A score in which information indicating the bicycle mark and the direction of the bicycle mark are considered is output by learning the learning data.

In the embodiment, the bicycle mark may be used to determine a type of road. For example, when an image is input, the trained model derives a score for estimating a roadway or a sidewalk. The road type recognition unit 120 may correct the derived score using presence or absence of the bicycle mark or the direction of the bicycle mark and recognize a type of road based on the corrected result. For example, even when a score for estimating a region of interest is a sidewalk is derived and a bicycle mark indicating a direction of a bicycle (for example, the bicycle mark B1 in FIG. 3 or the bicycle mark B2 in FIG. 4) is displayed in the region of interest, the road type recognition unit 120 may recognize that the region of interest is not a sidewalk or may determine that the type of road in the region of interest cannot be recognized. When the type of road in the region of interest cannot be recognized, the road type recognition unit 120 may perform a process of recognizing the type of road in the region of interest again or may perform a process of recognizing the type of road using a region shifted from the region of interest as a region of interest.

The control device 100 may apply a process of recognizing whether a region of interest is a roadway or a sidewalk using a bicycle mark in various modes (modes A to C). For example, in the case of movement on a sidewalk in various modes, a limit speed may be limited to the second speed.

As described above, the control device 100 can realize control of a mobile object in accordance with a type of road by recognizing the type of road in the region of interest with high accuracy based on the bicycle mark for guiding passage of a bicycle detected by a detection device that detects an external situation of the mobile object.

The above-described embodiment can be expressed as follows:

a control device for a mobile object which includes a storage medium storing computer-readable instructions and a processor connected to the storage medium and in which the processor executing the computer-readable instructions to control a mobile object that is able to move in both a roadway and a predetermined region different form the roadway, to recognize whether a region of interest is a roadway or a sidewalk based on a bicycle mark used for guiding a passage of a bicycle and detected by a detection device that detects an external situation of the mobile object, and to control the mobile object based on a result of the recognition.

The embodiments for carrying out the present invention have been described above, but the present invention is not limited to the embodiments. Various modifications and substitutions can be made within the scope of the present invention without departing from the gist of the present invention.

REFERENCE SIGNS LIST

10 External Detection device
12 Mobile object sensor
14 Operator
16 Internal camera
18 Positioning device
22 Mode changeover switch
30 Mobile mechanism
40 Driving device
50 External report device
70 Storage device
100 Control device
120 Road type recognition unit
130 Recognition unit
140 Control unit

The invention claimed is:

1. A control device for a mobile object that is able to move in both a roadway and a sidewalk, the control device comprising:

a hardware processor configured to recognize whether a region of interest is a roadway or a sidewalk based on a bicycle mark used for guiding a passage of a bicycle and detected by a detection device that detects an external situation of the mobile object; and a control unit configured to control the mobile object based on a result of the recognition of the hardware processor, wherein the hardware processor is configured to:

when the direction of the bicycle mark is recognizable, recognize a road on one side in a left-right direction relative to a traveling direction guided by the bicycle mark as the roadway and a road on another side as the sidewalk, based on the bicycle mark and a direction of the bicycle mark; and when the direction of the bicycle mark is not recognizable, recognize whether the region of the interest is a roadway or a sidewalk based on one or both of the bicycle mark and widths of right and left roads of the bicycle marks and a sign provided in vicinity of the bicycle mark.

2. The control device for the mobile object according to claim 1, wherein the hardware processor recognizes whether the region of interest is a roadway or a sidewalk based on the bicycle mark and a direction of the bicycle mark.

3. The control device for the mobile object according to claim 1, wherein the hardware processor recognizes whether the region of interest is a roadway or a sidewalk based on the bicycle mark and a sign provided in vicinity of the bicycle mark.

4. The control device for the mobile object according to claim 1, wherein the hardware processor recognizes whether the region of interest is a roadway or a sidewalk based on the bicycle mark and widths of a first road on which the bicycle mark is displayed and a second road adjacent to the first road.

5. The control device for the mobile object according to claim 4, wherein the hardware processor recognizes a road with a narrow width between the first and second roads as a sidewalk and recognizes a road with a broad width between the first and second roads as a roadway.

6. The control device for the mobile object according to claim 1, wherein, when the bicycle mark is disposed on a first road and a boundary object for distinguishing the first road from a second road adjacent to the first road is adjacent to the bicycle mark, the hardware processor recognizes whether the second road is a roadway or a sidewalk based on one or both of presence or absence of a vehicle on the first and second roads and the width of the first road and the width of the second road.

7. The control device for the mobile object according to claim 6, wherein the boundary object is a curbstone, a fence, a guardrail, a planting, or a marking line displayed on a road.

8. The control device for the mobile object according to claim 7, wherein the hardware processor recognizes a road on which there is no vehicle between the first and second roads as a sidewalk.

9. The control device for the mobile object according to claim 7, wherein the hardware processor recognizes a road of which the width is narrow width between the first and second roads as a sidewalk.

10. The control device for the mobile object according to claim 7, wherein the hardware processor identifies a road of which the width is narrow between the first and second roads and recognizes the identified road as a sidewalk when there is no vehicle on the identified road.

11. The control device for the mobile object according to claim 1, wherein the hardware processor recognizes whether the region of interest is a roadway or a sidewalk based on the bicycle mark, a direction of the bicycle mark, widths of right and left roads of the bicycle mark, and a sign provided in vicinity of the bicycle mark.

12. The control device for the mobile object according to claim 1, wherein the hardware processor recognizes whether the region of interest is a roadway or a sidewalk based on the bicycle mark and a direction of the bicycle mark when the direction of the bicycle mark is recognizable, and recognizes whether the region of the interest is a roadway or a sidewalk based on one or both of the bicycle mark and widths of right and left roads of the bicycle marks and a sign provided in vicinity of the bicycle mark when the direction of the bicycle mark is not recognizable.

13. The control device for the mobile object according to claim 1, wherein the control unit controls the mobile object in a roadway mode for traveling on a roadway when the mobile object is located on a road recognized as a roadway by the hardware processor, and controls the mobile object in a sidewalk mode for traveling on a sidewalk when the mobile object is located on a road recognized as a sidewalk by the hardware processor.

14. The control device for the mobile object according to claim 1, wherein the control unit limits an upper limit speed during traveling of the mobile object to a first speed when the mobile object is located on a road recognized as a roadway by the hardware processor, and limits an upper limit speed during traveling of the mobile object to a second speed less than the first speed when the mobile object is located on a road recognized as a sidewalk by the hardware processor.

15. A control method for a mobile object in a control device for a mobile object that is able to move in both a roadway and a sidewalk, the method comprising:

recognizing whether a region of interest is a roadway or a sidewalk based on a bicycle mark used for guiding a passage of a bicycle and detected by a detection device that detects an external situation of the mobile object;

controlling the mobile object based on a result of the recognition;

when the direction of the bicycle mark is recognizable, recognizing a road on one side in a left-right direction relative to a traveling direction guided by the bicycle mark as the roadway and a road on another side as the sidewalk, based on the bicycle mark and a direction of the bicycle mark; and when the direction of the bicycle mark is not recognizable, recognizing whether the region of the interest is a roadway or a sidewalk based on one or both of the bicycle mark and widths of right and left roads of the bicycle marks and a sign provided in vicinity of the bicycle mark.

16. A non-transitory storage medium storing a program causing a control device for a mobile object that is able to move in both a roadway and a sidewalk to perform:

recognizing whether a region of interest is a roadway or a sidewalk based on a bicycle mark used for guiding a passage of a bicycle and detected by a detection device that detects an external situation of the mobile object; and controlling the mobile object based on a result of the recognition;

when the direction of the bicycle mark is recognizable, recognizing a road on one side in a left-right direction relative to a traveling direction guided by the bicycle mark as the roadway and a road on another side as the sidewalk, based on the bicycle mark and a direction of the bicycle mark; and when the direction of the bicycle mark is not recognizable, recognizing whether the region of the interest is a roadway or a sidewalk based on one or both of the bicycle mark and widths of right and left roads of the bicycle marks and a sign provided in vicinity of the bicycle mark.

* * * * *